United States Patent [19]

Howard et al.

[11] Patent Number: 5,498,469

[45] Date of Patent: Mar. 12, 1996

[54] THIN PANELS OF NON-WOODY LIGNOCELLULOSIC MATERIAL

[76] Inventors: Robert E. Howard, 2400 Mission Ave., Eugene, Oreg. 97403; Karl E. Kaser, 37675 Elizabeth Dr., Lebanon, Oreg. 97355

[21] Appl. No.: 348,344

[22] Filed: Dec. 2, 1994

[51] Int. Cl.⁶ .............................. B32B 5/12; B32B 23/08
[52] U.S. Cl. ..................... 428/218; 428/332; 428/425.1; 428/507; 428/534; 428/114
[58] Field of Search ................................ 428/425.1, 534, 428/507, 218, 332

[56] References Cited

U.S. PATENT DOCUMENTS 3,867,250  2/1975  Jankowiak et al. ..................... 428/543
4,743,484  5/1988  Robbins .................................. 428/106
4,794,027  12/1988  Hering .................................... 428/507

Primary Examiner—P. C. Sluby
Attorney, Agent, or Firm—Robert E. Howard

[57] ABSTRACT

A thin panel consisting essentially of a compressed non woody lignocellulosic material and a binder. The thin panel has a thickness of less than about 0.10 inch (2.54 mm), preferably between about 0.06 inch (1.6 mm) and about 0.10 inch (2.54 mm). The preferred binder is a polyisocyanate. The non-woody lignocellulosic material may be straw, bagasse, hemp, flax shives or jute sticks. The preferred non-woody lignocellulosic materials are selected from the group consisting of straw and bagasse. The bagasse may be substantially non-depithed. The thin panel is useful as core stock in plywood.

16 Claims, No Drawings

THIN PANELS OF NON-WOODY LIGNOCELLULOSIC MATERIAL

BACKGROUND OF THE INVENTION

This invention relates to thin panels of non-woody lignocellulosic material. The invention further relates to thin panels of non-woody lignocellulosic material that can be used as core stock in plywood.

Plywood is a glued wood panel comprised of relatively thin layers or plies. The construction usually comprises an odd number of plies with the grain of adjacent layers being at an angle, usually 90 degrees. The outside plies are called faces, or face and back plies. The inner ply or plies are called the core ply or plies, or simply core stock.

The face ply is usually of higher quality than the core stock, particularly where visual appearance is important such as with hardwood plywood used for decorative wall panels, furniture or cabinets.

Although the core stock material currently used is usually a wood veneer of lesser quality than the face plies it nevertheless must possess adequate strength characteristics and be free of holes of any significant size and number.

Non-woody lignocellulosic materials, particularly straw and bagasse, have no substantial commercial value and, in the past, large amounts have been field burned. Environmental concerns have recently curtailed field burning to a large extent.

Coincidentally, it has become increasingly difficult to find adequate supplies of satisfactory wood veneer core stock, particularly for hardwood plywood manufacture.

SUMMARY OF THE INVENTION

An object of this invention is to produce a thin panel of non-woody lignocellulosic material with good strength characteristics. It is another object of this invention to produce a thin panel of non-woody lignocellulosic material that is useful as core stock in the manufacture of plywood.

These and other objects are achieved as more fully described below.

DESCRIPTION OF THE PREFERRED EMBODIMENTS

The thin panel of this invention consists essentially of compressed non-woody lignocellulosic material and a resin binder. The binder is present in an amount of between about 3% and about 10% by weight of the panel, preferably between about 3% and about 6% by weight.

By "thin" it is meant a non-woody lignocellulosic panel having a maximum thickness of about 0.10 inch (2.5 mm). Preferably the thickness range is between about 0.06 inch (1.6 mm) and about 0.10 inch (2.5 mm). The aforementioned thickness can be achieved either by forming the panel at the desired thickness or by forming the panel at a greater thickness and sanding one or both planar faces to remove enough material to achieve the desired thickness. The latter is the preferred method since sanding is beneficial in preparing the planar faces to form a stronger glue line when the thin panel is formed into plywood.

The non-woody lignocellulosic materials useful in the present invention include straw, bagasse, hemp, flax shives and jute sticks. It is preferred to use a non-woody lignocellulosic material selected from the group consisting of straw and bagasse.

Straw is the above ground part of cereal and grass seed plants remaining after the grain or grass seed has been removed. Species of cereal crops providing straw suitable for use in this invention include wheat, rice, rye, oats and barley. Species of grass seed crops providing straw suitable for use in this invention include fescue, annual and perennial ryegrass, bluegrass and bentgrass. Where straw is used in practicing the present invention it is preferred to use grass seed straw.

Bagasse is the fibrous and non-fibrous residual remaining after sugar is removed from sugar cane in the refining process. The bagasse useful in the present invention includes both depithed bagasse (bagasse from which the pith has been removed) and bagasse with the pith remaining.

Straw is usually baled prior to removal from the field. Although some breakage of the straw stem may have occurred during harvesting and baling, the straw as removed from the field is too long to be used in preparing the board of this invention and must be shortened. This is accomplished by any milling device capable of reducing the length of the straw stem, such as a hammermill. The average length of the straw segments recovered from milling can be controlled by selecting appropriate milling conditions.

The length of the milled straw segments will vary from segment to segment; the optimum amount of milling and size reduction can be determined by making panels and testing for those strength characteristics most desired. Generally speaking, the average straw segment size, not including fines, will desirably be between about 0.50 inch and about 1.25 inches in length, preferably between about 0.75 inch and about 1.25 inches in length. It is preferable that the milling be done under conditions to minimize the production of fines. However, it should be noted that it appears to be desirable to have some fines present; it is believed that they tend to fill in the gaps between the larger segments thereby enabling better adhesion, and thus a stronger panel, to be obtained.

Bagasse, especially non-depithed bagasse, can contain a substantial amount of non-fibrous fines (pith) after the sugar refining process. Despite such a large amount of non-fibrous fine material (non-depithed bagasse can contain up to 50% by bone dry weight of pith) such material has surprisingly been found to produce a thin panel having very satisfactory strength characteristics. The reason for this is believed to be the same just discussed relative to straw, i.e., the fines appear to fill in the gaps between larger segments thereby enabling better adhesion to be obtained. However, the larger pieces of the fibrous portion of the bagasse must be reduced in size, and, as in the case of straw, this can be accomplished by use of a milling device such as a hammermill to reduce the average fiber length, not including fines, to the same range as for straw. The larger pieces do not have to be separated from the fines prior to milling. If it is found that the amount of fines remaining after milling is so great as to lower the strength characteristics of the panel below that required, the fines may either be partially or substantially wholly removed from the milled bagasse by screening or other means of classification either before or after milling. Alternatively, using depithed bagasse will provide a starting material having fewer non-fibrous fines.

The thin panels of this invention are prepared by milling the non-woody lignocellulosic material to the desired fiber size range; drying the material to a moisture content between about 3% and about 6% by weight of the bone dry material; applying an uncured resin binder to the material by any suitable means, such as spraying; preparing a mat of a thickness suitable to provide a panel of predetermined thickness after pressing; placing the mat into a press; and pressing the mat at a pressure and temperature suitable to cure the resin and provide a panel of predetermined thickness.

The resin binder may be any binder capable of providing a thin panel having satisfactory strength characteristics. The strength characteristics suitable for the present invention varies depending upon the requirements of the finished product. Generally speaking the strength requirement relates to "bending" or "flexure" strength, i.e., resistance to breaking upon bending. To be a suitable resin binder for the thin board of the present invention, the binder desirably should, with the amount used, provide a thin panel capable of reasonably resisting breaking upon being bent by hand. More specifically, where the thin panel is to be used as core stock in plywood, it should have strength characteristics such as to provide a plywood having adequate strength properties required for its intended use. The required strength characteristics for plywood are well known to those skilled in the art.

The preferred binder is a polyisocyanate such as polymeric diphenylmethane diisocyanate. It has been found that this binder provides a stronger thin panel at lower resin content levels than other resins such as phenol or urea formaldehydes.

EXAMPLE 1

A 100 pound bale of ryegrass straw was broken open and fed into a Bell hammermill equipped with a screen having 0.25 inch hole sizes. The straw was passed through the hammermill once to reduce the length of the straw stems. The milled straw had a moisture content of 12% based upon the bone dry weight of the straw. The milled straw was dried to a moisture content of 4% by passing it through an electrically heated rotary dryer. "RUBINATE" 1840, a polymethylene polyphenylene ester of isocyanic acid manufactured by ICI, was sprayed onto the milled straw as it was tumbled to achieve a resin content of about 5% by weight of the milled straw. A mat having a thickness of about 1.25 inches, a width of about 24 inches and a length of about 35 inches was assembled by hand on an aluminum caul plate. The caul plate and mat were inserted into the single opening of a Wabash hot press having a single ram upstroke. The press was closed and the mat subjected to a pressure of 400 psi and a temperature of 300 degrees F. for a period of 2 minutes. The press was opened and a flat straw panel having a thickness of 0.10 inch (2.54 mm) was removed. The rough edges consisting of unpressed material were sawn off. A sample piece about 6 inches square was cut from the thin panel. The sample was very stiff and resisted breaking when flexed by hand.

EXAMPLE 2

A thin strawboard panel, sanded both sides, having a thickness of 0.063 inch, a width of 50 inches and a length of 99 inches is prepared as in Example 1. A seven ply birch plywood panel is laid up using the thin strawboard panel as the innermost core ply. The face and back plies are birch having a thickness of 1/30 inch. The other four core plies are 1/16 inch thick alder. The glue between the plies is a ureaformaldehyde resin. The layup is placed into a plywood press and pressed at a pressure of 125 psi and a temperature of 225 degrees F. to form a plywood panel having an overall thickness of ½ inch. The plywood panel is removed from the press and the edges trimmed to provide a plywood panel having a final width of 4 feet and a final length of 8 feet.

EXAMPLE 3

The process of Example 1 was repeated except 100 pounds of Hawaiian sugarcane bagasse, supplied by C. Brewer and Company, Limited, was substituted for the straw. The bagasse had not been depithed and contained about 50% by bone dry weight of pith. The bagasse was milled as in Example 1 and dried to a moisture content of 4% by weight of bone dry bagasse. "RUBINATE" 1840 was sprayed onto the dried bagasse to achieve a resin content of 5% by weight of the bagasse. A mat about 1.0 inches thick, 24 inches wide and 35 inches long was laid up on an aluminum caul plate and the plate and mat inserted into the same Wabash press used in Example 1 where it was pressed at a pressure of 450 psi and a temperature of 300 degrees F. for 2 minutes. The press was opened and a flat, thin panel having a thickness of 0.10 inch (2.54 mm) was removed. The rough edges consisting of unpressed material were sawn off. A sample about 6 inches square was cut from the panel. The sample was very stiff and resisted breaking when flexed by hand.

We claim:

1. Core stock for plywood comprising a thin panel consisting essentially of a compressed non-woody lignocellulosic material and a binder, said thin panel having a thickness of about 0.1 inch or less.

2. The thin panel of claim 1 wherein the thickness of said thin panel is between about 0.06 inch and about 0.1 inch.

3. The thin panel of claim 1 wherein the binder is a polyisocyanate.

4. The thin panel of claim 3 in which the binder is present in the panel in an amount of between about 3% and about 6% by weight of the panel.

5. The thin panel of claim 4 wherein said panel has a density between about 0.5 g/cc and about 0.9 g/cc.

6. The thin panel of claim 1 wherein said non-woody lignocellulosic material is selected from the group consisting of straw and bagasse.

7. The thin panel of claim 6 wherein said non-woody lignocellulosic material is straw.

8. The thin panel of claim 6 wherein said non-woody lignocellulosic material is bagasse.

9. The thin panel of claim 8 wherein said bagasse is substantially non-depithed.

10. A plywood panel having at least three plies including at least one core ply, a face ply and a back ply, at least one of said core plies being a thin panel consisting essentially of a compressed non-woody lignocellulosic material and a binder, said thin panel having a thickness of 0.10 inch or less, said face ply being formed of wood.

11. The plywood panel of claim 10 wherein said face ply is formed of a hardwood.

12. The plywood panel of claim 10 wherein the thickness of said thin panel is between about 0.06 inch and about 0.1 inch.

13. The plywood panel of claim 10 wherein said binder is a polyisocyanate.

14. The plywood panel of claim 13 wherein said binder is present in the thin panel in an amount of between about 3% and about 6% by weight of said thin panel.

15. Core stock for plywood comprising a thin panel consisting essentially of a non-woody lignocellulosic material selected from the group consisting of straw and bagasse and a polyisocyanate binder, said thin panel having a thickness between about 0.06 inch and 0.1 inch and a density between about 0.5 g/cc and about 0.9 g/cc.

16. A plywood panel having at least three plies, including at least one core ply, a face ply and a back ply, at least one of said core plies being a thin panel consisting essentially of a non-woody lignocellulosic material selected from the group consisting of straw and bagasse and a polyisocyanate binder, said thin panel having a thickness between about 0.06 inch and 0.1 inch and a density between about 0.5 g/cc and about 0.9 g/cc.

* * * * *